(12) United States Patent
Wang et al.

(10) Patent No.: US 10,089,301 B2
(45) Date of Patent: Oct. 2, 2018

(54) METHOD AND APPARATUS FOR DETERMINING SEMANTIC SIMILARITY OF CHARACTER STRINGS

(71) Applicant: Xiaomi Inc., Beijing (CN)

(72) Inventors: Pingze Wang, Beijing (CN); Tao Zhang, Beijing (CN); Fei Long, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/348,697

(22) Filed: Nov. 10, 2016

(65) Prior Publication Data

US 2017/0161260 A1    Jun. 8, 2017

(30) Foreign Application Priority Data

Dec. 3, 2015 (CN) .......................... 2015 1 0882468

(51) Int. Cl.
G06F 17/27 (2006.01)

(52) U.S. Cl.
CPC ...... *G06F 17/2785* (2013.01); *G06F 17/2705* (2013.01)

(58) Field of Classification Search
CPC ...................................................... G06F 17/02
USPC .......................... 704/1, 9, 10, 257, 270–275
See application file for complete search history.

(56) References Cited

U.S. PATENT DOCUMENTS

| | | | |
|---|---|---|---|
| 5,757,959 A | 5/1998 | Lopresti | |
| 6,810,376 B1 * | 10/2004 | Guan | G06F 17/2785 704/9 |
| 7,107,204 B1 | 9/2006 | Liu et al. | |
| 7,644,047 B2 * | 1/2010 | Assadian | G06F 17/2795 704/9 |
| 8,170,969 B2 * | 5/2012 | Roettger | G06F 17/278 706/45 |
| 9,672,206 B2 * | 6/2017 | Carus | G06F 17/2785 |
| 2001/0031088 A1 | 10/2001 | Natori | |

(Continued)

FOREIGN PATENT DOCUMENTS

| | | |
|---|---|---|
| CN | 101561813 A | 10/2009 |
| CN | 101751430 A | 6/2010 |

(Continued)

OTHER PUBLICATIONS

International Search Report dated Aug. 30, 2016 for International Application No. PCT/CN2015/099523, 5 pages.

(Continued)

*Primary Examiner* — Jesse Pullias
(74) *Attorney, Agent, or Firm* — Brinks Gilson & Lione

(57) ABSTRACT

A method and device for determining semantic similarity between two character strings are disclosed. The two character strings are segmented into sequences of words or phrases which represent the correlation between the characters. Edit distance from the first sequence to the second sequence is calculated based on a predetermined algorithm. A minimum semantic distance is then determined from the edit distance by considering the word/phrase pairs appearing in both sequences and the relationship between the cost of the various operations performed to convert the first sequence into the second sequence. The semantic similarity between the two character strings is then determined and normalized from the minimum semantic distance.

18 Claims, 11 Drawing Sheets

(56) References Cited

U.S. PATENT DOCUMENTS

| | | | |
|---|---|---|---|
| 2004/0141354 | A1 | 7/2004 | Carnahan |
| 2009/0175545 | A1* | 7/2009 | Cancedda .............. G06K 9/627 |
| | | | 382/229 |
| 2010/0121850 | A1 | 5/2010 | Moitra et al. |
| 2010/0121864 | A1 | 5/2010 | Stuhec et al. |
| 2011/0016111 | A1 | 1/2011 | Xie et al. |
| 2015/0051896 | A1 | 2/2015 | Simard et al. |
| 2015/0347393 | A1 | 12/2015 | Futrell et al. |

FOREIGN PATENT DOCUMENTS

| | | |
|---|---|---|
| CN | 101957828 A | 1/2011 |
| CN | 102622338 A | 8/2012 |
| CN | 103399907 A | 11/2013 |
| EP | 2 457 151 A1 | 5/2012 |
| JP | 2005/352888 A | 12/2005 |
| JP | 2012-533818 A | 12/2012 |
| JP | 2015-079380 A | 4/2015 |
| KR | 10-2001-0071841 A | 7/2001 |
| KR | 10-2010-0116595 A | 11/2010 |
| RU | 2 501 078 C2 | 12/2013 |
| WO | WO 2011/011046 A1 | 1/2011 |
| WO | WO 2014/136173 A1 | 9/2014 |

OTHER PUBLICATIONS

English Abstract of "Optimization and Implementation of Edit Distance Algorithm," http://wenku.baidu.com/view/df531365227916888586d702.html, 2015, 22 pages.

Office Action dated Dec. 15, 2017 for Japanese Application No. 2017-553299, 4 pages.

Chan, Samuel W. K., "An Edit Distance Approach to Shallow Semantic Labeling," Intelligent Data Engineering and Automated Learning 2007, LNCS 4881, 2007, pp. 57-66.

English Translation of International Search Report dated Aug. 30, 2016 for International Application No. PCT/CN2015/099523, 4 pages.

Extended European Search Report dated May 17, 2017 for European Application No. 16190672.2, 11 pages.

Kim, Jongik, English Language Abstract of "An Efficient Edit Similarity Search Technique Using Prefix Element Selection," Journal of KIISE: Computing Practices and Letters, vol. 18, No. 9, Sep. 2012, pp. 654-659.

Ko, Sang-Ki et al., English Language Abstract of "Computing the Edit Distance between a Regular Language and a Context-Free Language," Journal of Kiise: Computing Practices and Letters, vol. 18, No. 6, Jun. 2012, pp. 464-468.

Notice of Allowance dated Aug. 31, 2017 for Korean Application No. 10-2016-7006741, 2 pages.

Office Action dated Sep. 28, 2017 for Chinese Application No. 201510882468.2, 7 pages.

Office Action dated Feb. 20, 2017 for Korean Application No. 10-2016-7006741, 5 pages.

Office Action dated Jun. 23, 2017 for Russian Application No. 2016118758/08, 13 pages.

Tian, Xia et al., English Language Abstract of "Improved Edit Distance Algorithm and Chinese Sentence Similarity Computing," Chinese Science and Technology, 2004, 6 pages.

University of Electronic Science and Technology of China, English Language Abstract of Master Dissertation, University of Electronic Science and Technology of China, 2011, 87 pages.

Wagner, Robert A. et al., "The String-to-String Correction Problem," Journal of the Association for Computing Machinery, vol. 21, No. 1, 1974, 9 pages.

\* cited by examiner

METHOD AND APPARATUS FOR DETERMINING SEMANTIC SIMILARITY OF CHARACTER STRINGS

CROSS-REFERENCE TO RELATED APPLICATIONS

This application is based on and claims priority to Chinese Patent Application No. 201510882468.2, filed on Dec. 3, 2015, the entire contents of which are incorporated herein by reference.

TECHNICAL FIELD

The present disclosure generally relates to the field of natural language processing, and more particularly, to a method and an apparatus for determining semantic similarity of character strings.

BACKGROUND

In the field of natural language processing, a similarity between character strings may be determined, which may be used as basis for many applications such as text clustering and information retrieval.

In related art, the similarity between character strings may be determined by calculating an edit distance between two character strings. Specifically, the two character strings may be respectively segmented into characters. Then one or more of a deletion operation, an insertion operation or a replacement operation of character (collectively referred to as "conversion operations" together with other editing operations) may be performed on characters in one character string so that the character string is converted into the other character string. Then a minimum number of operations required for converting the one character string into the other one is calculated and is taken as the edit distance between the two character strings. Finally the similarity between the two character strings is calculated according to the edit distance.

SUMMARY

The present disclosure provides methods and devices for determining semantic similarity between two character strings. This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for determining semantic similarity is disclosed. The method includes performing word or phrase segmentation on a first character string and a second character string to obtain a first sequence and a second sequence, the first sequence and the second sequence comprising at least one word or phrase; determining an edit distance between the first character string and the second character string according to a predefined edit distance algorithm, the first sequence and the second sequence; and determining a semantic similarity between the first character string and the second character string according to the edit distance and information on operations for converting the first sequence into the second sequence.

In another embodiment, a terminal device is disclosed. The terminal device includes a processor and a memory configured to store instructions executable by the processor, wherein, the processor is configured to perform word or phrase segmentation on a first character string and a second character string, to obtain a first sequence and a second sequence, the first sequence and the second sequence comprising at least one word or phrase; determine an edit distance between the first character string and the second character string according to a predefined edit distance algorithm, the first sequence and the second sequence; and determine a semantic similarity between the first character string and the second character string according to the edit distance and information on operations for converting the first sequence into the second sequence.

In yet another embodiment, a non-transitory computer-readable storage medium having stored therein instructions is disclosed. The instructions, when executed by a processor of a terminal device, causes the terminal device to perform word or phrase segmentation on a first character string and a second character string to obtain a first sequence and a second sequence, the first sequence and the second sequence comprising at least one word or phrase; determine an edit distance between the first character string and the second character string according to a predefined edit distance algorithm, the first sequence and the second sequence; and determine a semantic similarity between the first character string and the second character string according to the edit distance and information on operations for converting the first sequence into the second sequence.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Terms used in the disclosure are only for purpose of describing particular embodiments, and are not intended to be limiting. The terms "a", "said" and "the" used in singular form in the disclosure and appended claims are intended to include a plural form, unless the context explicitly indicates otherwise. It should be understood that the term "and/or" used in the description means and includes any or all combinations of one or more associated and listed terms.

It should be understood that, although the disclosure may use terms such as "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

In the field of natural language processing, the capability to determine a semantic similarity between character strings may be critical to many applications, such as text clustering and information retrieval, etc. In natural language, characters are arranged into indivisible words or phrases and further, different order of words or phrases may not change the meaning of the natural language string. Thus, two strings that appear very dissimilar from a character to character comparison standpoint may nevertheless be similar in a semantic sense. The embodiments of the present disclosure provide methods and apparatus for determining semantic similarity between two natural language strings with improved accuracy.

Figure 1:
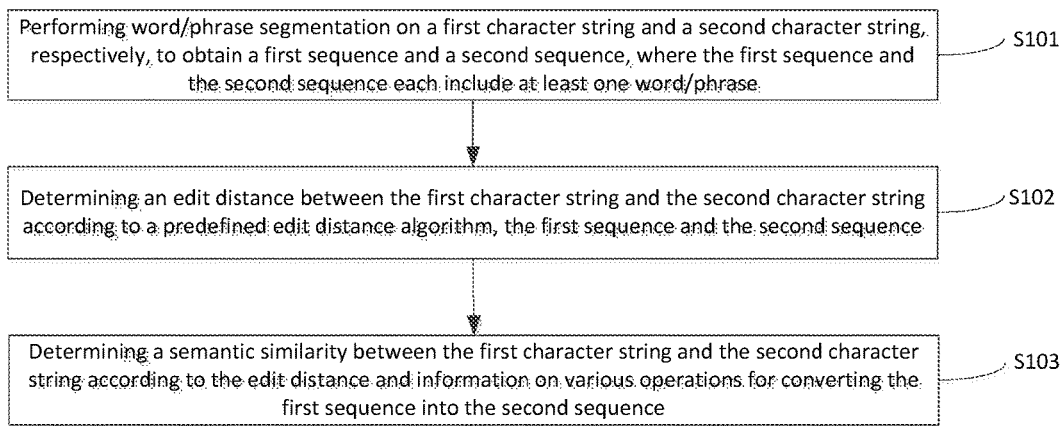
FIG. 1 is a flowchart illustrating a method for determining similarity between two strings according to an exemplary embodiment.

FIG. 1 is a flowchart illustrating a method for determining semantic similarity between two strings according to an exemplary embodiment. The method for determining semantic similarity provided by the embodiments of the present disclosure may be used in any electronic device such as a terminal device. As shown in FIG. 1, the method for determining semantic similarity provided by the embodiments of the present disclosure includes the following steps. Some detailed implementation with examples will be given later in FIG. 2.

In Step S101, word segmentation is performed on a first character string and a second character string to obtain a first sequence and a second sequence, where the first sequence and the second sequence each include at least one word. In Step S102, an edit distance between the first character string and the second character string is determined according to a predefined edit distance algorithm, the first sequence, and the second sequence. In Step S103, a semantic similarity between the first character string and the second character string is determined according to the edit distance and information on various conversion operations for converting the first sequence into the second sequence.

To be more specific, in the method provided above, word segmentation is performed on the first character string and the second character string so that they are segmented into a first sequence and a second sequence. Thus, the edit distance between the first and second character strings is determined based at least on conversion operations on words in the first sequence and the second sequence rather than characters in the first character string and the second character string. Each word in the character string may include at least one character. Thereby, the semantic similarity between the two strings can be determined according to at least the word-based edit distance which inherently includes word-level correlation among characters in the character string. Thus the semantic similarity determined this way may be more accurate linguistically compared to similarity based on a character-level edit distance.

In one implementation of Step 103, determination of the semantic similarity between the first and second character strings according to the edit distance and information on various conversion operations from the first into the second sequence may exemplarily include:

acquiring replacement operation information among the information on various conversion operations for converting from the first into the second sequence (denoted as step 103-1);

determining a pairing number according to the replacement operation information, where the pairing number refers to the number of pairs of two words that exist in both the first sequence and the second sequence (denoted as step 103-2); and determining the semantic similarity between the first and the second character strings according to the edit distance, the pairing number, an operation costs of various operations, the number of words in the first sequence and the number of words in the second sequence (denoted as step 103-3).

In one specific implementation of the last sub-step of the embodiment of Step 103 above (the 103-3), i.e., determination of the semantic similarity between the first character string and the second character string according to the edit distance, the pairing number, the operation costs of various operations, the number of words in the first sequence and the number of words in the second sequence, the various operations may include a replacement operation and a swap operation, and the sub-step may include:

determining a minimum semantic edit distance between the first character string and the second character string according to the edit distance, the pairing number, an operation cost of the replacement operation and an operation cost of the swap operation (denoted as 103-3-1);

normalizing the minimum semantic edit distance to obtain a normalized result (denoted as 103-3-2); and determining the semantic similarity between the first character string and the second character string according to the normalized minimum semantic edit distance (donated as 103-3-3).

In another specific implementation of the last sub-step of the embodiment of Step 103 above (103-3), i.e., determination of the semantic similarity between the first character string and the second character string according to the edit distance, the pairing number, operation costs of various operations, the number of words in the first sequence and the number of words in the second sequence, the various operations may include at least one of a replacement operation, a swap operation, an insertion operation, and a deletion operation, and the sub-step may include:

determining a first semantic edit distance between the first character string and the second character string according to the edit distance, the pairing number, an operation cost of the replacement operation and an operation cost of the swap operation (donated as 103-1');

determining a second semantic edit distance between the first character string and the second character string according to the operation cost of the replacement operation, one of an operation cost of the insertion operation and an operation cost of the deletion operation, and the number of words in the first sequence and the number of words in the second sequence (donated as 103-2'); and determining the semantic similarity between the first character string and the second character string according to the first semantic edit distance and the second semantic edit distance (donated as 103-3').

In another embodiment, the method may further include steps to determining cost for various conversion operations as follows:

determining the operation cost of the replacement operation and the operation cost of the swap operation according to a relation between the replacement operation and the swap operation; and determining the operation cost of the insertion operation, the operation cost of the deletion operation and the operation cost of the replacement operation according to a relation among the replacement operation, the insertion operation and the deletion operation.

The relationship between the replacement operation and swap operation, for example, may be that a swap operation may be alternatively achieved by two replacement operations. The relationship between replacement operation, insertion operation and deletion operation, for example, may be that a replacement operation may be alternatively achieved by a deletion operation followed by an insertion operation.

These steps will become clear to those of ordinary skill in the art with respect to the description and examples given below and later in this specification. For example, the steps for determining cost for various conversion operations may include:

determining that the operation cost of a replacement operation multiplied by 2 is greater than the operation cost of the swap operation according to the relation between the replacement operation and the swap operation (although a swap operation can be alternatively achieved by two replacement operation, swap operation may represent a lower cost because both words are present in both the first and second character strings); and determining that a sum of the operation cost of the insertion operation and the operation cost of the deletion operation is greater than the operation cost of the replacement operation according to a relation among the replacement operation, the insertion operation and the deletion operation (although a replacement operation may be alternatively achieved by a combination of delete operation and insertion operation, general combination of delete operation and insertion operation represents higher cost because the replacement operation is a special and lower cost of deletion/insertion operations that occur at the same location in a character string).

In another embodiment, the method may further includes a step to determine the operation cost of insertion and deletion as follows: determining that the operation cost of the insertion operation is equal to the operation cost of the deletion operation according to a relation between the insertion operation and the deletion operation (e.g., insertion operation and deletion operation are both a single step operation of adding to or deleting a word from a character string).

In an exemplary embodiment for Step 102 above, i.e., the determination of the edit distance between the first character string and the second character string according to the predefined edit distance algorithm, the first sequence and the second sequence, Step 102 may include:

determining the edit distance d between the first character string and the second character string having n and m words/phrases in their sequences according to the predefined edit distance algorithm operated on the first sequence, and the second sequence based on example recursive Formula I as below:

Formula I:

$$d[i, j] = \min ( \\ d[i-1, j] + \cos(S), \\ d[i, j-1] + \cos(C), \\ d[i-1, j-1] + (\cos(T) \text{ if } S1(i) \neq S2(j); \text{ but } 0 \text{ if } S1(i) = S2(j)) \quad )$$

Here, i denotes an ith word/phrase in the first sequence; j denotes a jth word/phrase in the second sequence; cost (S) is the operation cost of the deletion operation, cost (C) is the operation cost of the insertion operation, and cost(T) is the operation cost of the replacement operation. The words or phrases in the first and second sequence may be represented by (S1(1), S1(2), S1(3), . . . , S1(n)) and (S2(1), S2(2), S2(3), . . . , S2(m)). Thus d[i, j] represents the editing distance between the sub sequence containing the first i words/phrases of the first sequence and the subsequence of the second sequence containing the first j words/phrases of the second sequence. The algorithm starts with initial edit distance, for example, d[i, 0] of min(i×cost(C), i×cost(S)), and d[0, j] of min(j×cost(C), j×cost(S)). The algorithm then calculate d(1, 1), d(1,2), d(2, 1), . . . , d(n, m), each based on previous d values. The final value, d(n, m) is the calculated editing distance, d, from the first character string to the second character string.

In one implementation of the step 103-3-1, i.e., determination of the minimum semantic edit distance between the first character string and the second character string according to the edit distance, the pairing number, the operation cost of the replacement operation and the operation cost of the swap operation, step 103-3-1 may include:

determining the minimum semantic edit distance between the first character string and the second character string according to the edit distance, the pairing number, the operation cost of the replacement operation and the operation cost of the swap operation based on Formula II as below:

$$\text{minCost}(S1,S2) = d - p(2\text{cost}(T) - \text{cost}(J)); \quad \text{Formula II:}$$

Here, S1 and S2 are respectively the first character string and the second character string, minCost(S1,S2) is the minimum semantic edit distance, d is the edit distance, p is the pairing number, cost(J) is the operation cost of the swap operation, cost(T) is the operation cost of the replacement operation, and 2cost(T)−cost(J)>0. Detailed explanation for Formula II will be given with respect to the specific embodiment of FIG. 2 below.

In one implementation of the Step 103-1' above, i.e., determination of the first semantic edit distance between the first character string and the second character string according to the edit distance, the pairing number, the operation cost of the replacement operation and the operation cost of the swap operation, Step 103-1' may include:

determining the first semantic edit distance between the first character string and the second character string according to the edit distance, the pairing number, the operation cost of the replacement operation and the operation cost of the swap operation based on Formula III as below:

$$\text{minCost}(S1,S2)=d-p(2\text{cost}(T)-\text{cost}(J));\qquad\text{Formula III:}$$

Here, S1 and S2 are respectively the first character string and the second character string, minCost(S1,S2) is the first semantic edit distance, d is the edit distance, p is the pairing number, cost(J) is the operation cost of the swap operation, cost(T) is the operation cost of the replacement operation, and 2cost(T)−cost(J)>0.

In one implementation of Step 103-2', i.e., determination of the second semantic edit distance between the first character string and the second character string according to the operation cost of the replacement operation, one of the operation cost of the insertion operation and the operation cost of the deletion operation, the number of words in the first sequence and the number of words in the second sequence, Step 103-2' may include:

determining the second semantic edit distance between the first character string and the second character string according to the operation cost of the replacement operation, one of the operation cost of the insertion operation and the operation cost of the deletion operation, the number of words in the first sequence and the number of words in the second sequence based on Formula IV as below:

$$\text{normFact}(S1,S2)=\min(n,m)\text{cost}(T)+(\max(n,m)-\min(n,m))\times\text{cost}M$$

$$\text{cost}M=\text{cost}(C),\text{ if }n<m$$

$$\text{cost}M=\text{cost}(S),\text{ if }n>m;\qquad\text{Formula IV:}$$

Here, normFact (S1,S2) is the second semantic edit distance for converting from S1 to S2, n is the number of words in the first sequence, m is the number of words in the second sequence, cost(T) the operation cost of the replacement operation, cost(S) is the operation cost of the deletion operation, and cost(C) is the operation cost of the insertion operation.

In one implementation of Step 103-3', i.e., determination of the similarity between the first character string and the second character string according to the first semantic edit distance and the second semantic edit distance, Step 103-3' may include:

determining the similarity between the first character string and the second character string according to the first semantic edit distance and the second semantic edit distance based on Formula V as below:

$$\text{sim}(S1,S2)=1-\text{minCost}(S1,S2)/\text{normFact}(S1,S2);\qquad\text{Formula V:}$$

Here, sim(S1,S2) is the similarity between the first character string and the second character string, minCost (S1,S2) is the first semantic edit distance, and normFact (S1,S2) is the second semantic edit distance.

Optional embodiments of the present disclosure may be formed by arbitrary combination of all the foregoing optional technical solutions, and will be not elaborated herein.

Figure 2:
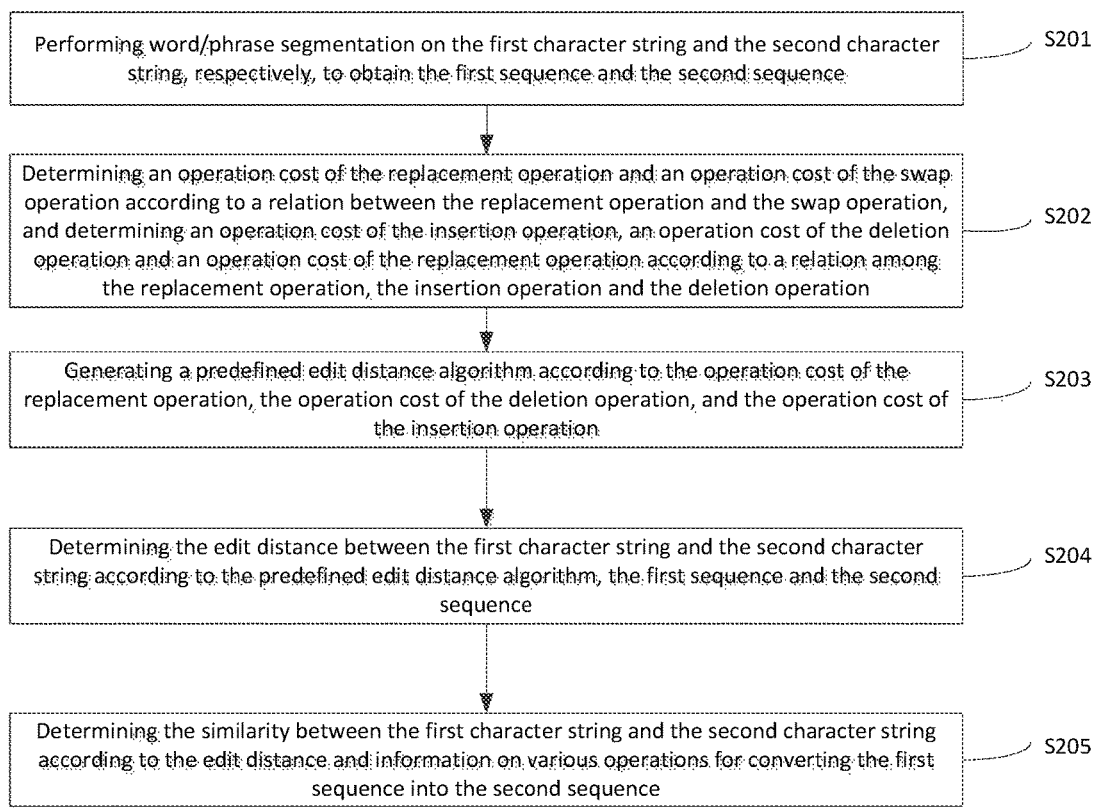
FIG. 2 is a flowchart illustrating another method for determining similarity between two strings according to an exemplary embodiment.

With reference to the content of the embodiment corresponding to FIG. 1, FIG. 2 is a flowchart illustrating a specific method embodiment for determining similarity between two strings based on the FIG. 1. The method may be used, for example, in a terminal device. As shown in FIG. 2, the method for determining similarity provided by the embodiments of the present disclosure includes the following steps.

In Step S201, word segmentation is performed on the first character string and the second character string to obtain the first sequence and the second sequence. Specifically, characters in a character string may not be completely independent but correlated in that they form units of words. That is, some adjacent character strings may be indivisible. For an example in both English and Chinese, in "today I am going to climb the Fragrant Hill (今天我去爬香山)", "today (今天)" and "the Fragrant Hill (香山)" are indivisible. "Fragrant" and "Hill" are each indivisible word in English. "Fragrant Hill" may not be a well-known phrase in English but its Chinese counterpart, "香山", contains two Chinese characters and is a famous spot in Northwestern suburb of Beijing. For the purpose of this disclosure, "Fragrant Hill" may be treated as "Mount Everest" and indivisible. Therefore, when the similarity between two character strings is determined in the embodiments of the present disclosure, the two character strings are advantageously segmented into words or phrases (more than one word), rather than characters. For simplicity, words and phrases as a basis for the segmentation of character strings into sequences are collectively and interchangeably referred to as either "words" or "phrases" or "words/phrases". In Step 201, a first sequence is obtained after the first character string is segmented into phrases, and a second sequence is obtained after the second character string is segmented into phrases. The first sequence and the second sequence each include at least one word/phrase. For example, when the first character string and the second character string are represented by S1 and S2 respectively, the first sequence and the second sequence are (S11, S12, S13, . . . , S1n) and (S21, S22, S23, . . . , S2m), respectively. The number of words/phrases in S1 is n, and the number of words in S2 is m.

As shown by the example above, the embodiments of the present disclosure do not specifically limit the language of the first character string and the second character string. For example, both the first character string and the second character string may be in Chinese or English. Both the first character string and the second character string may be a sentence. For example, the first character string may be "today I am going to the Fragrant Hill (今天我打算去 香山)", and the second character string is "I am going today to the Fragrant Hill (我打算今天去 香山)".

In Step S202, the operation cost of the replacement operation and the operation cost of the swap operation are specified according to a relation between the replacement operation and the swap operation. Further, the operation cost of the insertion operation, the operation cost of the deletion operation, and the operation cost of the replacement operation are determined according to a relation among the replacement operation, the insertion operation and the deletion operation.

In a traditional method for determining the similarity between character strings, when one character string is converted into the other character string, three editing operations are typically used, namely, the insertion operation, the deletion operation and the replacement operation, and the three operations are deemed to have the same operation cost. However, in a character string, some elements (words/phrases) appear in different locations of the character string, but may not change the whole linguistic meaning of the character string. For example, three character strings "today I am going to the Fragrant Hill (今天我打算去香山)", "I am going today to the Fragrant Hill (我打算今天去香山)", and "I today am going to the Fragrant Hill (我 今天打算去香山)" have the same meaning although words appear in different locations of the character strings (the third string may not sound grammatically correct in English but its Chinese counterpart is perfectly legal and thus for the purpose of this disclosure, view the third string as grammatically correct). The traditional method may inaccurately treat these three character strings as very different after determining the editing operations needed among insertion, deletion and replacement. In the embodiments of the present disclosure, in additional to the traditional insertion/deletion/replacement operations, a swap operation is introduced and defined. Further, different operation costs are differentiated and defined for different operations according to a relation among various operations, as will be described below.

The embodiments of the present disclosure do not specifically limit the specific values for the operation costs of various operations. In some embodiment, the cost of editing operations may be determined based on the relationship between the operations. For example, a swap operation is related to replacement operations because one swap may be divided into two replacement operations. Therefore, in one embodiments of the present disclosure, the replacement operation cost and the swap operation cost may be determined according to such relationship. Specifically, the relation between the replacement operation cost and the swap operation cost may be defined to satisfy: 2× the operation cost of the replacement operation> the operation cost of the swap operation, namely:

$$2\mathrm{cost}(T) - \mathrm{cost}(J) > 0,$$

meaning that a swap operation cost less than having to achieve the same with two replacement operations. In other words, two strings that can be made the same via a swap operation are considered more similar that two strings that can only be made the same via two separate replacement operations. Herein, cost(T) represents the operation cost of the replacement operation, and cost(J) is the operation cost of the swap operation.

Similarly, a replacement operation may be divided into a deletion operation and an insertion operation. Therefore, in one non-limiting implementation of this disclosure, the insertion operation cost and the deletion operation cost may be determined according to this relation between the replacement operation, the insertion operation and the deletion operation. For example, the relation among the replacement operation cost, the swap operation cost and the deletion operation cost as may satisfy: the sum of the operation costs of the insertion operation and the deletion operation is greater than the operation cost of the replacement operation. Further, it may be determined sensibly that the operation cost of the replacement operation is greater than the maximum value of the operation cost of the insertion operation and the operation cost of the deletion operation. Thus, the cost relation may be expressed as:

$$\max(\mathrm{cost}(C), \mathrm{cost}(S)) < \mathrm{cost}(T) < \mathrm{cost}(C) + \mathrm{cost}(S).$$

Herein, cost(S) represents the operation cost of the deletion operation, and cost(C) is the operation cost of the insertion operation.

Furthermore, when operations to bring the two character strings to the same are symmetric, e.g., when inserting a word/phrase into the first character string is equivalent to deleting a word/phrase from the second character string, it may be determined the insertion operation cost is equal to the deletion operation cost according to the relation between the insertion operation and the deletion operation. Of course, in the case that the similarity is asymmetrical, it may also be defined that the insertion operation cost is unequal or equal to the deletion operation cost, which is not specifically limited in the embodiments of the present disclosure.

In Step S203, a predefined edit distance algorithm is generated according to the operation cost of the replacement operation, the operation cost of the deletion operation, and the operation cost of the insertion operation. For example, the predefined edit distance algorithm may be based on the recursive Formula I as described above and shown below.

Formula I:
  d[i, j]=min (
    d[i−1, j]+cos(S),
    d[i, j−1]+cos(C),
    d[i−1, j−1] + (cos(T) if S1(i)≠S2(j); but 0 if S1(i)=S2( j) )   )

Here, i denotes an ith word/phrase in the first sequence; j denotes a $j^{th}$ word in the second sequence; cost(S) is the operation cost of the deletion operation; cost(C) is the operation cost of the insertion operation; and cost(T) is the operation cost of the replacement operation. Thus, the predefined edit distance algorithm in the embodiments of the present disclosure may be recursive, and the predefined edit distance algorithm is obtained according to the operation cost of the deletion operation, the operation cost of the insertion operation and the operation cost of the replacement operation that are predefined as discussed above. Specifically, the words or phrases in the first and second sequence may be represented by (S1(1), S1(2), S1(3), . . . , S1(n)) and (S2(1), S2(2), S2(3), . . . , S2(m)). Thus d[i, j] represents the editing distance between the sub sequence containing the first i words/phrases of the first sequence and the subsequence of the second sequence containing the first j words/phrases of the second sequence. The algorithm starts with initial edit distance, for example, d[i, 0] of min(i×cost(C), i×cost(S)), and d[0, j] of min(j×cost(C), j×cost(S)). The algorithm then calculate d(1, 1), d(1,2), d(2, 1), . . . , d(n, m), each based on previous d values. The final value, d(n, m) is the calculated editing distance, d, from the first character string to the second character string.

It is to be noted that Steps S202 and S203 above are steps to be executed before determining the similarity between the first and second strings, but are not required to be executed each time when the similarity between two character strings need to be determined, as long as it is ensured that the operation costs of various editing operations and the predefined edit distance algorithm (Formula I, for example) have already been established before determining the similarity between two strings.

In Step S204, the edit distance between the first character string and the second character string is determined according to the predefined edit distance algorithm (Algorithm I, for example), the first sequence, and the second sequence. Herein, the edit distance between two character strings relate to the minimum number of editing operations required for converting one character string into the other one, where each editing operation corresponds to an operation cost. A total operation cost for conversion may be taken as the edit distance. In the embodiments of the present disclosure, for the conversion between character strings, available editing operations may include a replacement operation, an insertion operation, a deletion operation and a swap operation. There may be many ways of converting one string to another. The conversion corresponding to the edit distance may contain a combination of replacement, insertion, swap, or deletion operations.

With reference to the predefined edit distance algorithm above (Formula I), when the edit distance between the first character string and the second character string is determined according to that example of predefined edit distance algorithm, the first sequence and the second sequence, the edit distance between the first character string and the second character string can be determined based on a recursive computation using Formula I, the first sequence and the second sequence. The principle of calculating the edit distance based on Formula I is the same as that of calculating the edit distance based on existing recursive programming algorithm, and thus is not elaborated in the embodiments of the present disclosure.

The following provides an example for the determination of edit distance based on Formula I. Assume the first character string is "I am going today to the Fragrant Hill (我打算今天去香山)" and the first sequence is "I-am going-today-to-the Fragrant Hill (我-打算-去-香山- 今天)". Also assume that the second character string is "today I am going to the Fragrant Hill (今天我打算去香山)", and the second sequence is "today-I-am going-to-the Fragrant Hill (今天-我-打算-去-香山)". A assume that the edit distance for conversion from the first sequence to the second sequence needs to be calculated. Also assume that cost(C)=cost(S)=cost(S/C), and cost(T)=2×cost(S/C). Table 1 shows the recursive calculation based on Formula I.

In Step S205, the similarity between the first character string and the second character string is determined according to the edit distance calculated above and information on various operations for converting the first sequence into the second sequence. Herein, the information on various operations for converting the first sequence into the second sequence includes operation types, the number of operation for each type, and the different cost associated with editing operation of each type. Because the operation costs of various editing operations required for converting the first character string into the second character string are incorporated into the edit distance discussed above and thus directly affect the edit distance (e.g., Formula I). Therefore, the similarity between the first character string and the second character string can be determined according to the edit distance and operation information on various operations for obtaining the edit distance, the operation information includes the operation costs, and the operation costs of various operations for obtaining the edit distance are predetermined in Step S202.

TABLE 1

| 香山 (the Fragrant Hill) | 5; d(5, 0) = 5 × cost(S/C) | d(5, 1) = 4 × cost(S/C) | d(5, 2) = 5 × cost(S/C) | d(5, 3) = 4 × cost(S/C) | d(5, 4) = 3 × cost(S/C) | d(5, 5) = 2 × cost(S/C) |
| 去 (to) | 4; d(4, 0) = 4 × cost(S/C) | d(4, 1) = 3 × cost(S/C) | d(4, 2) = 4 × cost(S/C) | d(4, 3) = 3 × cost(S/C) | d(4, 4) = 2 × cost(S/C) | d(4, 5) = 3 × cost(S/C) |
| 今天 (today) | 3; d(3, 0) = 3 × cost(S/C) | d(3, 1) = 2 × cost(S/C) | d(3, 2) = 3 × cost(S/C) | d(3, 3) = 2 × cost(S/C) | d(3, 4) = 3 × cost(S/C) | d(3, 5) = 4 × cost(S/C) |
| 打算 (am going) | 2; d(2, 0) = 2 × cost(S/C) | d(2, 1) = 3 × cost(S/C) | d(2, 2) = 2 × cost(S/C) | d(2, 3) = 1 × cost(S/C) | d(2, 4) = 2 × cost(S/C) | d(2, 5) = 3 × cost(S/C) |
| 我 (I) | 1; d(1, 0) = cost(S/C) | d(1, 1) = 2 × cost(S/C) | d(1, 2) = 1 × cost(S/C) | d(1, 3) = 2 × cost(S/C) | d(1, 4) = 3 × cost(S/C) | d(1, 4) = 4 × cost(S/C) |
| | 0 | 1; d(0, 1) = cost(S/C) 今天 (today) | 2; d(0, 2) = 2 × cost(S/C) 我 (I) | 3; d(0, 3) = 3 × cost(S/C) 打算 (am going) | 4; d(0, 4) = 4 × cost(S/C) 去 (to) | 5; d(0, 5) = 5 × cost(S/C) 香山 (the Fragrant Hill |

For example, if the operations for converting the first character string into the second character string include two insertion operations, one deletion operation, one swap operation and one replacement operation, the edit distance d between the first character string and the second character string is d=2cost(C)+cost(S)+cost(T)+cost(J). Determination of the similarity between the first character string and the second character string may be made according to the edit distance, the operation cost of the insertion operation, the operation cost of the deletion operation, the operation cost of the swap operation, and the operation cost of the replacement operation.

For example, determination of the similarity between the first character string and the second character string, according to the edit distance and information on various operations for converting the first sequence into the second sequence, includes but not limited to the following exemplary embodiment including Steps S205-1 through S205-3.

In Step S205-1, replacement operation information upon obtaining the edit distance is acquired among the information on various operations for converting the first sequence into the second sequence in obtaining the edit distance. In the replacement operation, a certain word in the first character string is replaced by another word. In the embodiments of the present disclosure, when the edit distance is determined, a statistical calculation may be performed on the replacement operation information during conversion, and the replacement operation information is recorded in a specified set (for all replacement operations). In one embodiment, the replacement operation information includes a replaced word in the replacement operation and a location of the replaced word/phrase in the sequence being converted. Therefore, data recorded in the specified set includes the replaced word and the location of the replaced word in the first sequence.

For example, assuming that the first character string is "I am going today to Fragrant Hill (我打算今天去香山)", the first sequence is "I-am going-today-to-the Fragrant Hill (我-打算-今天-去-香山)". Also suppose that in obtaining the editing distance according a predetermined algorithm, such as formula I above, two replacement operations have been made involving replacing phrases "the Fragrant Hill (香山)" and "am going to (打算)" in the first sequence. Then the replacement operation information recorded in the specified set includes "am going to (打算)-2, the Fragrant Hill (香山)-5". Therefore, the replacement operation information, at the time the edit distance is obtained, among the information on various operations for converting the first character string into the second character string, can be acquired from the specified set, specifically including replaced words of various replacement operations and the location of each replaced word in the first sequence.

In addition, in the embodiments of the present disclosure, the swap operation is additionally defined according to the relation between the replacement operation and the swap operation, and 2cost(T)−cost(J)>0 is predefined. Thus it can be seen that the cost of two replacement operations is greater than that of one swap operation. Therefore, when it is feasible to convert the first character string into the second character string through one swap operation, it may not be preferable to implement the conversion through two replacement operations. As such, the some of the replacement operations in the set of conversion operations corresponding to the edit distance process may be achieved by less costly swap operations. These replacement operations may be identified in the recorded specified set for the first sequence described above by determining whether there are pairs of replaced phrases in the specified set that also appear in the second sequence. Therefore, in addition to recording in the specified set replaced words and location of each replaced word in the first sequence, it may be further determined whether any two-word combination in the specified set exists in the second sequence. If any two-word combination exists in the second sequence, the two-word combination and the location of each word in the combination in the second sequence will also be recorded in the specified set.

For example, if the first character string is "I am going today to the Fragrant Hill (我打算今天去香山)", the first sequence is "I-am going-today-to-the Fragrant Hill (我-打算-去-香山-今天)" and suppose that the replaced words are "the Fragrant Hill (香山)" and "am going (打算)" when obtaining the edit distance; the second character string is "today I am going to the Fragrant Hill (今天我打算去香山)", and the second sequence is "today-I-am going-to-the Fragrant Hill (今天-我-打算-去-香山)". Because the replaced words "the Fragrant Hill (香山)" and "am going (打算)" exist in both the first sequence and the second sequence, data recorded in the specified set may be "am going-S12(打算-S12), the Fragrant Hill-S15(香山-S15); am going-S23(打算-S23), the Fragrant Hill-S25(香山-S25)".

In the embodiments of the present disclosure, "the Fragrant Hill (香山)" and "am going (打算)" are defined as a matching word pair between the first character string and the second character string. Herein, a matching word/phrase pair refers to any two-phrase combination existing in both the first sequence and the second sequence.

In Step S205-2, a pairing number is determined according to the replacement operation information.

The pairing number refers to the number of matching pairs in the first sequence and the second sequence as recorded in the specified set, i.e., the number of two-word combinations existing in both the first sequence and the second sequence. As can be known from the foregoing explanation of data recorded in the specified set, the pairing number may be determined according to the data recorded in the specified set.

For example, if the data recorded in the specified set is "am going-S12(打算-S12), the Fragrant Hill-S15(香山-S15); and additionally, am going-S23(打算-S23), the Fragrant Hill-S25(香山-S25); I-S11(我-S11), to-S14(去-S14); I-S21(我-S21), to-S24(去-S24)", the pairing number may be determined as 2. The first pair may be "am going (打算)" and "the Fragrant Hill (香山)", and the second pair may be "I (我)" and "to (去)". Alternatively, the first pair may be "am going (打算)" and "I (我)", and the second pair may be "the Fragrant Hill (香山)" and "to (去)". Alternatively, the first pair may be "am going (打算)" and "to (去)", and the second pair may be "the Fragrant Hill (香山)" and "I (我)". The possible number of pairs of phrases existing in both the first and second sequence in this example is 2.

In Step S205-3, the similarity between the first character string and the second character string is determined according to the edit distance, the pairing number, the operation costs of various operations, the number of words in the first sequence and the number of words in the second sequence.

In a first scenario, if the editing operations corresponding to the edit distance include replacement operations and swap operations, Step S205-3 may be specifically implemented through Steps S205-3-1 through S205-3-3 as below. In Step S205-3-1, a minimum semantic edit distance between the first character string and the second character string is determined according to the edit distance, the pairing number, the operation cost of the replacement operation and the operation cost of the swap operation. For example, the minimum semantic edit distance between the first character string and the second character string is determined according to the edit distance, the pairing number, the operation cost of the replacement operation and the operation cost of the swap operation based on Formula II (discussed with reference to FIG. 1) as below:

$$\text{minCost}(S1,S2)=d-p(2\text{cost}(T)-\text{cost}(J)) \quad \text{Formula II:}$$

Here, S1 and S2 are respectively the first character string and the second character string and minCost(S1,S2) is the minimum semantic edit distance, d is the edit distance, p is the pairing number, cost(J) is the operation cost of the swap operation, cost(T) is the operation cost of the replacement operation, and 2cost(T)−cost(J)>0. Thus, the above step recognizes that there may be approaches less costly than the operations used in the algorithm for obtaining the edit distance d. Specifically, if there are pairs of phrases in the first sequence that are replaced using replace operations and those pairs also appear in the second sequence, then the step above recognizes that those replacement operations may be alternatively achieved using a single swap operation, reducing the total cost.

In Step S205-3-2 for the first scenario, the minimum semantic edit distance is normalized to obtain a normalized result. For example, the minimum semantic edit distance may be normalized by using a maximum semantic edit distance between the first character string and the second character string. The maximum semantic edit distance for converting from the first string to the second string may be expressed as the following Formula IV:

$$\text{normFact}(S1,S2)=\min(n,m)\text{cost}(T)+(\max(n,m)-\min(n,m))\times\text{cost}M$$

$$\text{cost}M=\text{cost}(C), \text{ if } n<m$$

$$\text{cost}M=\text{cost}(S), \text{ if } n>m; \quad \text{Formula IV:}$$

Here, normFact (S1,S2) denotes the maximum semantic edit distance for converting from the first string to the second string, n denotes the number of words in the first sequence, and m denotes the number of words in the second sequence. The minimum semantic edit distance minCost (S1,S2) is normalized to generate a normalized minCost (S1,S2)/normFact (S1,S2). The minimum semantic edit distance is normalized, such that minCost (S1,S2)/normFact (S1,S2) can be mapped into a range between 0 and 1, thereby making it an intuitive measure of the similarity.

In Step S205-3-3, the similarity between the first character string and the second character string is determined according to the normalized result. For example, the similarity between the first character string and the second character string is determined according to the normalized result based on Formula V as below:

$$sim(S1,S2)=1-\text{minCost}(S1,S2)/\text{normFact}(S1,S2); \quad \text{Formula V:}$$

Here, sim (S1,S2) is the similarity between the first character string and the second character string, minCost (S1,S2) is the minimum semantic edit distance, normFact (S1,S2) is the maximum semantic edit distance, and minCost (S1,S2)/normFact (S1,S2) is the normalized result.

In the second scenario for step S205-3, the editing operations corresponding to the edit distance may include at least one of replacement operations, swap operations, insertion operations, or deletion operations. More specifically, in the embodiments of the present disclosure, when the similarity between the first character string and the second character string is determined according to the edit distance, the pairing number, the operation costs of various operations, the number of words in the first sequence and the number of words in the second sequence, the various conversion operations from the first sequence to the second sequence corresponding to the edit distance may include at least one of the replacement operation, the swap operation, the insertion operation and the deletion operation. On this basis, step S205-3 may be implemented through Steps S205-3-4 through S205-3-6 as below.

In Step S205-3-4, a first semantic edit distance between the first character string and the second character string is determined according to the edit distance, the pairing number, the operation cost of the replacement operation and the operation cost of the swap operation.

The first semantic edit distance may be the minimum semantic edit distance between the first character string and the second character string.

For example, the first semantic edit distance between the first character string and the second character string is determined according to the edit distance, the pairing number, the operation cost of the replacement operation and the operation cost of the swap operation by using, including but not limited to, Formula III as below:

$$\text{minCost}(S1,S2)=d-p(2\text{cost}(T)-\text{cost}(J)); \quad \text{Formula III:}$$

In Formula III, S1 and S2 separately denote the first character string and the second character string, minCost (S1,S2) denotes the first semantic edit distance, d denotes the edit distance, p denotes the pairing number, and cost(J) denotes the swap operation cost.

As can be seen from Formula III and Formula II, the first semantic edit distance may be the minimum semantic edit distance between the first character string and the second character string, considering that replacement operation of pairs of phrases appearing in both the first and second sequences may be replaced by lower-cost swap operations. In Formula II and Formula III, only minCost (S1,S2) denotes different meanings.

In Step S205-3-5, a second semantic edit distance between the first character string and the second character string is determined according to one of the operation cost of the insertion operation and the operation cost of the deletion operation, the operation cost of the replacement operation, the number of words in the first sequence and the number of words in the second sequence.

The second semantic edit distance may be the maximum semantic edit distance between the first character string and the second character string.

For example, the second semantic edit distance between the first character string and the second character string is determined according to either one of the operation cost of the insertion operation and the operation cost of the deletion operation, the operation cost of the replacement operation, the number of words in the first sequence and the number of words in the second sequence by using, including but not limited to, Formula IV as below:

$$\text{normFact}(S1,S2)=\min(n,m)\text{cost}(T)+(\max(n,m)-\min(n,m))\times\text{cost}M$$

$$\text{cost}M=\text{cost}(C), \text{ if } n<m$$

$$\text{cost}M=\text{cost}(S), \text{ if } n>m; \quad \text{Formula IV:}$$

In Formula IV, normFact (S1,S2) denotes the second semantic edit distance from the first sequence to the second sequence, n denotes the number of words in the first sequence, and m denotes the number of words in the second sequence.

Herein, normFact (S1,S2) is a normalizing factor, used for mapping minCost (S1,S2)/normFact (S1,S2) within a range between 0 and 1, thereby making it easy to intuitively determine the similarity.

In Step S205-3-6, the similarity between the first character string and the second character string is determined according to the first semantic edit distance and the second semantic edit distance.

For example, the similarity between the first character string and the second character string may be determined based on Formula V as below:

$$sim(S1,S2)=1-\text{minCost}(S1,S2)/\text{normFact}(S1,S2). \quad \text{Formula V:}$$

In Formula V, sim (S1,S2) denotes the similarity between the first character string and the second character string.

For example, when minCost (S1,S2) is 1.5 and normFact (S1,S2) is 2.5, the similarity between S1 and S2 is 1-1.5/2.5=0.4.

According to the method provided by the embodiments of the present disclosure, word/phrase segmentation is performed on the first character string and the second character string so that they are segmented into a first sequence and a second sequence. Thus, determination of the edit distance for converting the first character string into the second character string is implemented based on each word/phrase in the first sequence and the second sequence rather than each character (or just English word) in the first character string and the second character string. Each word/phrase in the character string may include at least one character. Thereby, the semantic similarity is determined according to the edit distance in combination with a correlation among characters (or English word) in the character string, enabling the determined semantic similarity to be more accurate.

Figure 3:
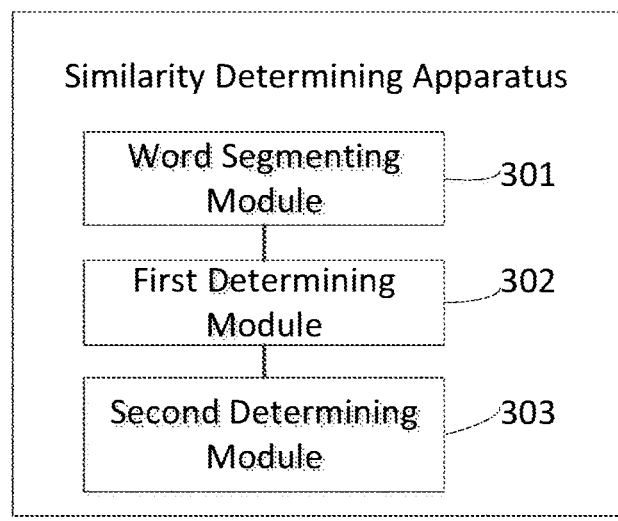
FIG. 3 is a block diagram illustrating an apparatus for determining similarity between two strings according to an exemplary embodiment.

FIG. 3 is a block diagram illustrating an apparatus for determining similarity according to an exemplary embodiment. Referring to FIG. 3, the apparatus for determining semantic similarity between two strings includes a word/phrase segmenting module 301 (also referred to just as a word segmenting module), a first determining module 302 and a second determining module 303.

The word/phrase segmenting module 301 is configured to perform word/phrase segmentation on a first character string and a second character string to obtain a first sequence and a second sequence, where the first sequence and the second sequence each include at least one word/phrase.

The first determining module 302 is configured to determine an edit distance between the first character string and the second character string according to a predefined edit distance algorithm, the first sequence and the second sequence.

The second determining module 303 is configured to determine a semantic similarity between the first character string and the second character string according to the edit distance and information on various operations for converting the first sequence into the second sequence.

According to the apparatus provided by the embodiments of the present disclosure, word/phrase segmentation is performed on the first character string and the second character string so that they are segmented into a first sequence and a second sequence, respectively. Thus, the edit distance can be determined based on phrases in the character string rather than characters (or just English work, or Chinese character) in the character string. Moreover, each word/phrase in the character string may include at least one character (or English word). The similarity may be thus determined according to the edit distance in combination with a correlation among characters (or English words) in the character string, enabling the determined semantic similarity to be more accurate.

Figure 4:
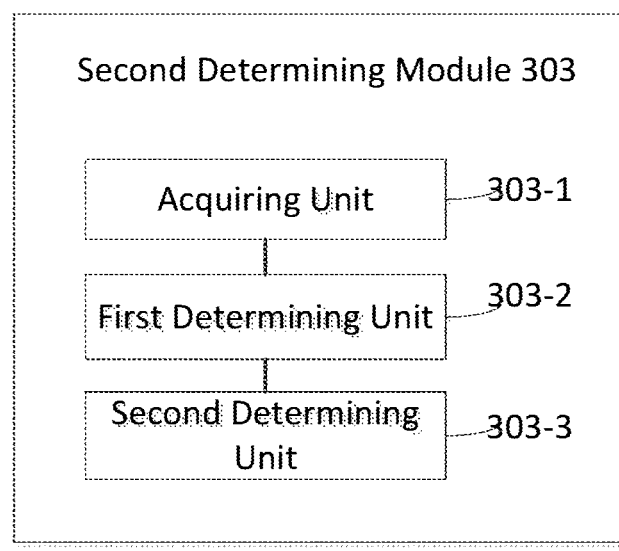
FIG. 4 is a block diagram illustrating an implementation of the second determining module 303 of FIG. 3 according to an exemplary embodiment.

In one specific implementation, referring to FIG. 4, the second determining module 303 includes an acquiring unit 303-1 configured to acquire replacement operation information among information on various operations for converting the first sequence into the second sequence; a first determining unit 303-2 configured to determine a pairing number according to the replacement operation information, where the pairing number refers to the number of two-word combination that exists in both the first sequence and the second sequence; and a second determining unit 303-3 configured to determine the semantic similarity between the first character string and the second character string according to the edit distance, the pairing number, the operation costs of various operations, the number of words in the first sequence and the number of words in the second sequence.

Figure 5:
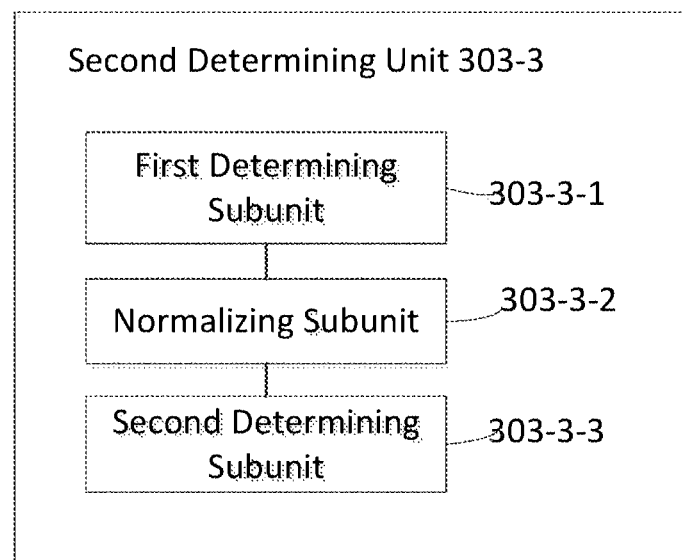
FIG. 5 is a block diagram illustrating an implementation of the second determining unit 303-3 of FIG. 4 according to an exemplary embodiment.

In one implementation of the second determining module 303-3, shown in FIG. 5, various operations include a replacement operation and a swap operation, and the second determining module 303-3 includes: a first determining subunit 303-3-1 configured to determine a minimum semantic edit distance between the first character string and the second character string according to the edit distance, the pairing number, the operation cost of the replacement operation and the operation cost of the swap operation; a normalizing subunit 303-3-2 configured to normalize the minimum semantic edit distance to obtain a normalized result; and a second determining subunit 303-3-3 configured to determine the semantic similarity between the first character string and the second character string according to the normalized result.

Figure 6:
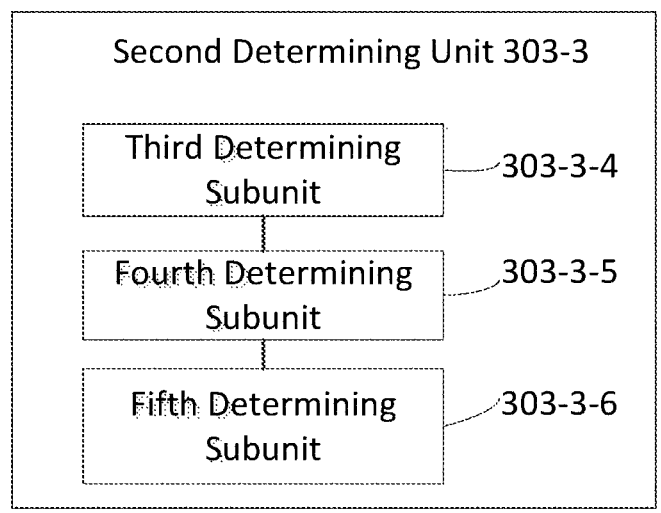
FIG. 6 is a block diagram illustrating another implementation of the second determining unit 303-3 of FIG. 4 according to an exemplary embodiment.

In another implementation of the second determining module 303-3, shown in FIG. 6, the various operations include at least one of a replacement operation, a swap operation, an insertion operation and a deletion operation, and the second determining unit 303-3 includes: a third determining subunit 303-3-4 configured to determine a first semantic edit distance between the first character string and the second character string according to the edit distance, the pairing number, the operation cost of the replacement operation and the operation cost of the swap operation; a fourth determining subunit 303-3-5 configured to determine a second semantic edit distance between the first character string and the second character string according to one of the operation cost of the insertion operation and the operation cost of the deletion operation, the operation cost of the replacement operation, the number of words in the first sequence and the number of words in the second sequence; and a fifth determining subunit 303-3-6 configured to determine the semantic similarity between the first character string and the second character string according to the first semantic edit distance and the second semantic edit distance.

Figure 7:
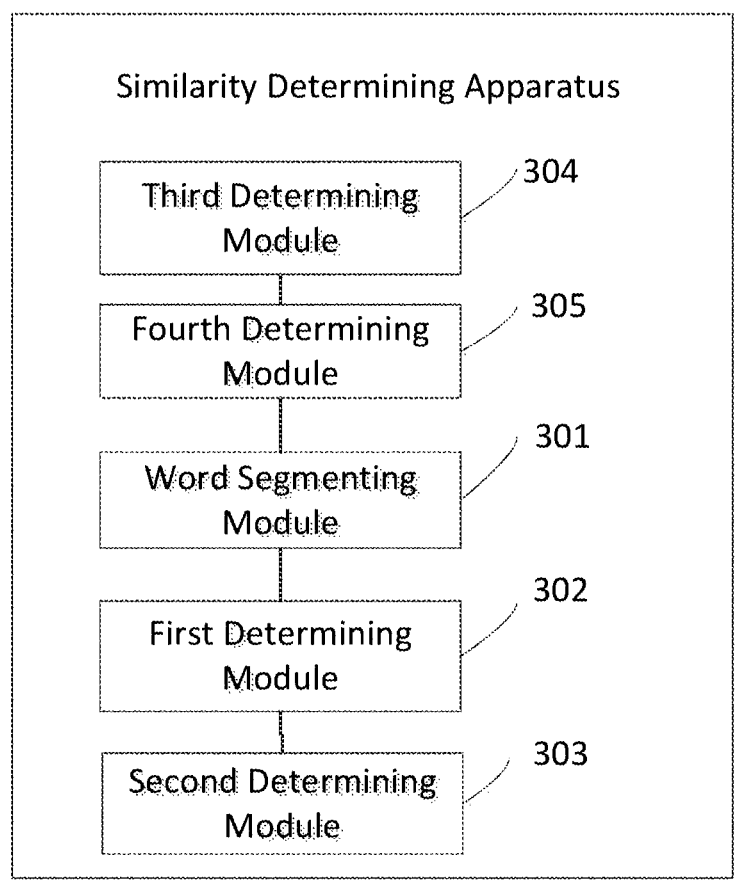
FIG. 7 is a block diagram illustrating another apparatus for determining similarity between two strings according to an exemplary embodiment.

In another embodiment, referring to FIG. 7, the apparatus further includes: a third determining module 304 configured to determine the operation cost of the replacement operation and the operation cost of the swap operation according to a relation between the replacement operation and the swap operation; and a fourth determining module 305 configured to determine the operation cost of the insertion operation, the operation cost of the deletion operation and the operation cost of the replacement operation according to a relation among the replacement operation, the insertion operation and the deletion operation.

Figure 8:
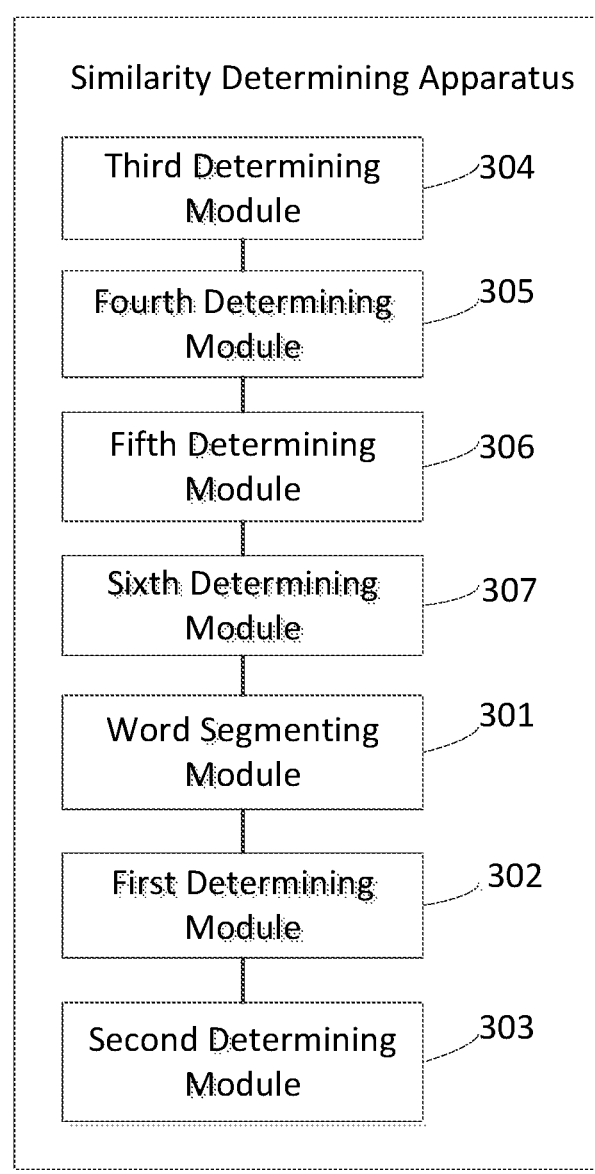
FIG. 8 is a block diagram illustrating another apparatus for determining similarity between two strings according to an exemplary embodiment.

In another embodiment, referring to FIG. 8, the apparatus further includes: a fifth determining module 306 configured to determine that 2 times the operation cost of the replacement operation is larger than the operation cost of the swap operation according to a relation between the replacement operation and the swap operation; and a sixth determining module 307 configured to determine that the operation cost of the insertion operation plus the operation cost of the deletion operation is larger than the operation cost of the replacement operation according to a relation among the replacement operation, the insertion operation and the deletion operation.

Figure 9:
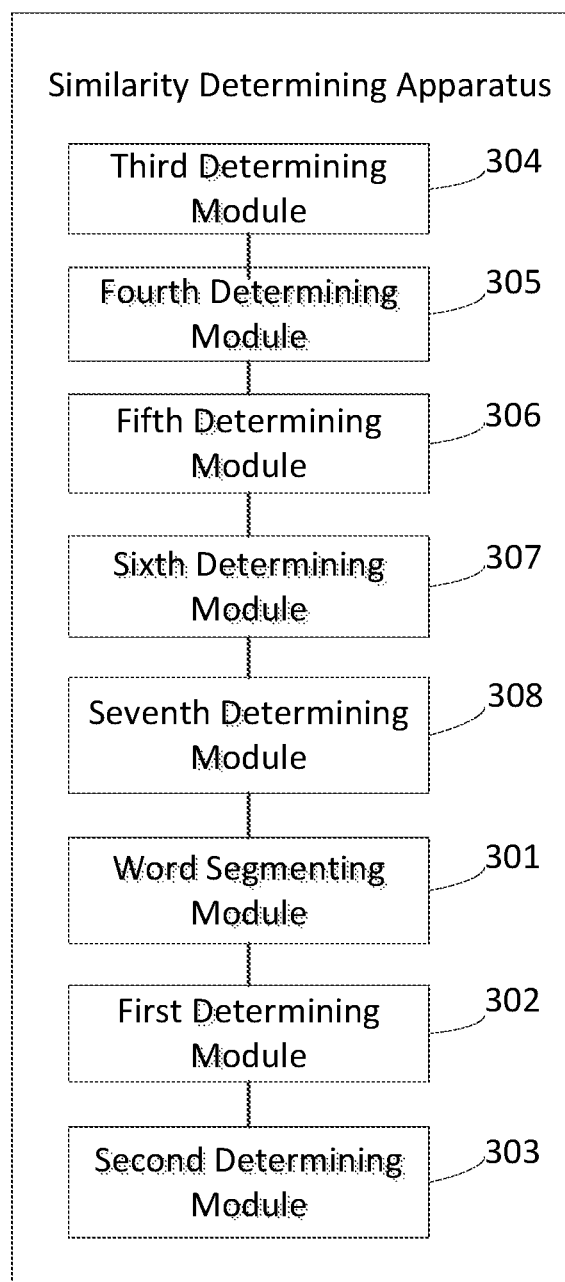
FIG. 9 is a block diagram illustrating another apparatus for determining similarity between two strings according to an exemplary embodiment.

In another embodiment, referring to FIG. 9, the apparatus further includes a seventh determining module 308 configured to determine that the operation cost of the insertion operation is equal to the operation cost of the deletion operation according to a relation between the insertion operation and the deletion operation.

In another embodiment, the first determining module 302 is configured to determine an edit distance between the first character string and the second character string according to a predefined edit distance algorithm, the first sequence and the second sequence based on the recursive Formula I as below:

---

Formula I:

$d[i, j] = \min\ ($
    $d[i-1, j]+\cos(S),$
    $d[i, j-1]+\cos(C),$
    $d[i-1, j-1] + (\cos(T)\ \text{if}\ S1(i) \neq S2(j);\ \text{but}\ 0\ \text{if}\ S1(i)=S2(j))\ )$

---

Here, i denotes an $i^{th}$ word in the first sequence; j denotes a $j^{th}$ word in the second sequence; cost(S) is the operation cost of the deletion operation, cost(C) is the operation cost of the insertion operation, and cost(T) is the operation cost of the replacement operation. The words or phrases in the first and second sequence may be represented by (S1(1), S1(2), S1(3), . . . , S1(n)) and (S2(1), S2(2), S2(3), . . . , S2(m)). Thus d[i, j] represents the editing distance between the sub sequence containing the first i words/phrases of the first sequence and the subsequence of the second sequence containing the first j words/phrases of the second sequence. The algorithm starts with initial edit distance, for example, d[i, 0] of min(i×cost(C), i×cost(S)), and d[0, j] of min(j× cost(C), j×cost(S)). The algorithm then calculate d(1, 1), d(1,2), d(2, 1), . . . , d(n, m), each based on previous d values. The final value, d(n, m) is the calculated editing distance, d, from the first character string to the second character string.

In one implementation, the first determining subunit 303-3-1 is configured to determine a minimum semantic edit distance between the first character string and the second character string according to the edit distance, the pairing number, the operation cost of the replacement operation and the operation cost of the swap operation based on Formula II as below:

$$\text{minCost}(S1,S2)=d-p(2\text{cost}(T)-\text{cost}(J)) \quad \text{Formula II:}$$

Here, S1 and S2 respectively are the first character string and the second character string, minCost (S1,S2) is the minimum semantic edit distance, d is the edit distance, p is the pairing number, cost(J) is the operation cost of the swap operation, cost(T) is the operation cost of the replacement operation, and 2cost(T)−cost(J)>0.

In one implementation, the third determining subunit 303-3-4 is configured to determine a first semantic edit distance between the first character string and the second character string according to the edit distance, the pairing number, the operation cost of the replacement operation and the operation cost of the swap operation based on Formula III as below:

$$\text{minCost}(S1,S2)=d-p(2\text{cost}(T)-\text{cost}(J)); \quad \text{Formula III:}$$

Here, S1 and S2 respectively are the first character string and the second character string, minCost (S1,S2) is the first semantic edit distance, d is the edit distance, p is the pairing number, cost(J) is the operation cost of the swap operation, cost(T) is the operation cost of the replacement operation, and 2cost(T)−cost(J)>0.

In another embodiment, the fourth determining subunit 303-3-5 is configured to determine the second semantic edit distance between the first character string and the second character string according to either one of the operation cost of the insertion operation and the operation cost of the deletion operation, the operation cost of the replacement operation, the number of words in the first sequence and the number of words in the second sequence based on Formula IV as below:

$$\text{normFact}(S1,S2)=\min(n,m)\text{cost}(T)+(\max(n,m)-\min(n,m))\times\text{cost}M$$

$$\text{cost}M=\text{cost}(C), \text{ if } n<m$$

$$\text{cost}M=\text{cost}(S), \text{ if } n>m; \quad \text{Formula IV:}$$

Here, normFact (S1,S2) is the second semantic edit distance, n is the number of words in the first sequence, m is the number of words in the second sequence, cost(T) is the operation cost of the replacement operation, cost(S) is the operation cost of the deletion operation, and cost(C) is the operation cost of the insertion operation.

In another embodiment, the fifth determining subunit 303-3-6 is configured to determine the semantic similarity between the first character string and the second character string according to the first semantic edit distance and the second semantic edit distance based on Formula V as below:

$$sim(S1,S2)=1-\text{minCost}(S1,S2)/\text{normFact}(S1,S2); \quad \text{Formula V:}$$

Here, sim (S1,S2) is the semantic similarity between the first character string and the second character string, min-Cost(S1,S2) is the first semantic edit distance, and normFact (S1,S2) is the second semantic edit distance.

Optional embodiments of the present disclosure may be formed by arbitrary combination of all the foregoing optional technical solutions, not repeated any more herein.

The apparatus for determining semantic similarity provided by the embodiments corresponding to FIGS. 3-9 may be configured to execute the methods for determining semantic similarity provided by the embodiments corresponding to FIG. 1 or 2. Specific manners for executing operations by modules thereof have been described in detail in the embodiments related to the methods, and thus are not repeated herein.

Figure 10:
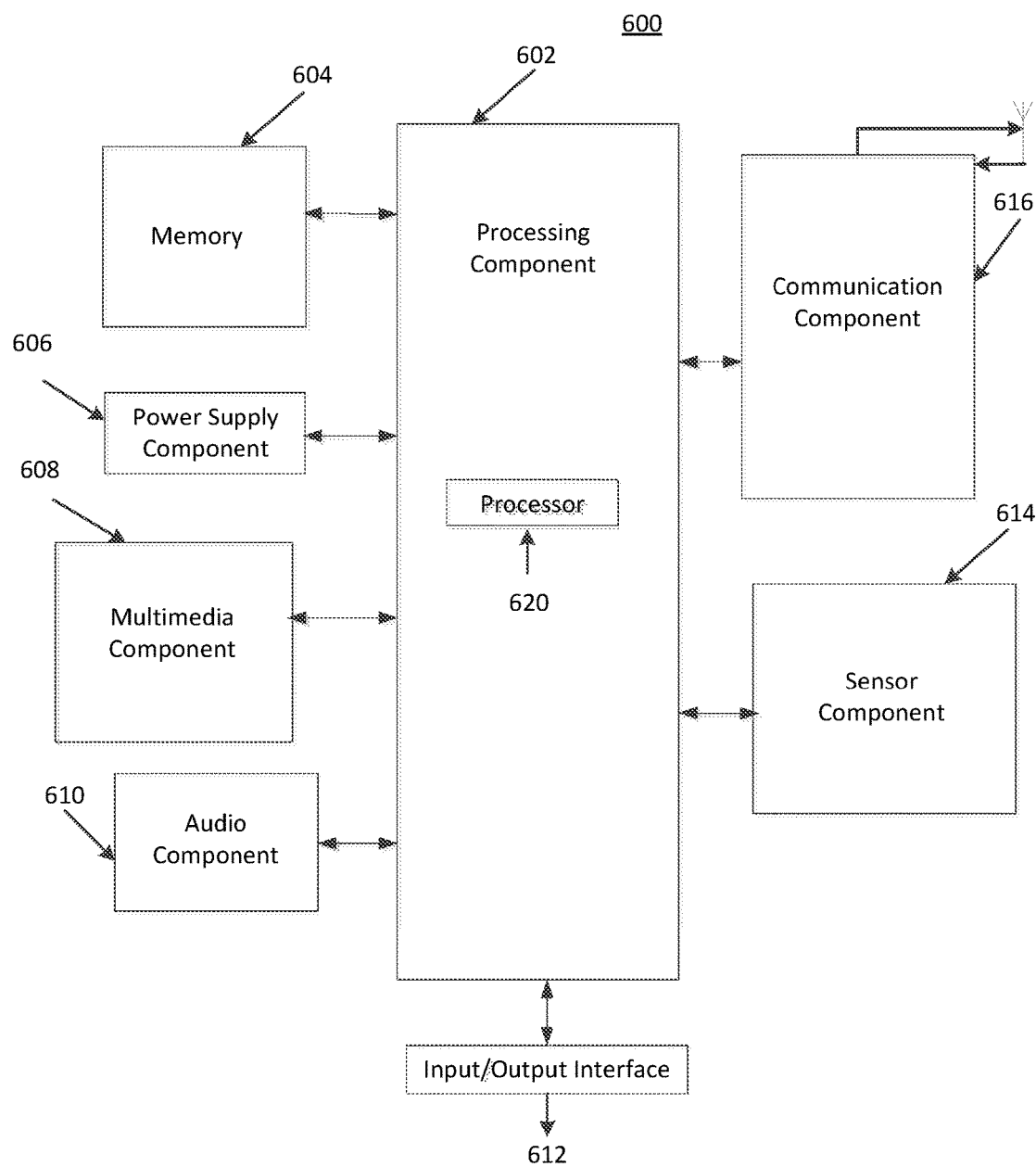
FIG. 10 is a block diagram illustrating a terminal device according to an exemplary embodiment.

FIG. 10 is a block diagram of a terminal 600 shown according to an exemplary embodiment. The terminal may be configured to execute the method for determining semantic similarity provided by the embodiments corresponding to FIG. 1 or 2. For example, the terminal 600 may be a mobile telephone, a computer, a digital broadcasting terminal, a message transceiver device, a games console, a tablet device, a medical device, a fitness facility, a PDA (personal digital assistant) and the like.

Referring to FIG. 10, the terminal 600 may include one or more components as below: a processing component 602, a memory 604, a power supply component 606, a multimedia component 608, an audio component 610, an I/O (Input/Output) interface 612, a sensor component 614 and a communications component 616.

The processing component 602 generally controls the overall operation of the terminal 600, for example, operations associated with display, telephone call, data communications, camera operation and record operation. The processing component 602 may include one or more processors 620 for executing an instruction to complete the steps of the foregoing method in part or in whole. In addition, the processing component 602 may include one or more modules for the convenience of interaction between the processing component 602 and other components. For example, the processing component 602 may include a multimedia module for the convenience of interaction between the multimedia component 608 and the processing component 602.

The memory 604 is configured to store various types of data so as to support the operation of the terminal 600. Examples of the data include an instruction of any application program or method operated on the terminal 600, contact data, phonebook data, a message, a picture and a video, etc. The memory 604 may be implemented by any type of volatile or non-volatile memory device or a combination thereof, for example, a static random access memory (SRAM), an electrically-erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The power supply component 606 provides power for components of the terminal 600. The power supply component 606 may include a power management system, one or more power supplies, and other components associated with generation, management and power distribution of the terminal 600.

The multimedia component 608 includes a screen between the terminal 600 and a user for providing an output interface. In some embodiments, a screen may include an LCD (Liquid Crystal Display) and a TP (Touch Panel). If the screen includes a touch panel, the screen may be implemented as a touch screen for receiving an input signal from the user. The touch panel includes one or more touch sensors for sensing touching, sliding and gestures on the touch panel. The touch sensor may not only sense a boundary of a touch or slide, but also detect the time duration and pressure related to the touch or slide operation. In some embodiments, the multimedia component 608 includes a front-facing camera and/or a rear-facing camera. When the terminal 600 is in an operation mode, for example, a shooting mode or a video mode, the front-facing camera and/or the rear-facing camera may receive external multimedia data. Each front-facing camera and rear-facing camera may be a fixed optical lens system or have a focal length and optical zoom capacity.

The audio component 610 is configured to output and/or input an audio signal. For example, the audio component 610 includes a microphone (MIC); when the terminal 600 is in an operation mode such as a call mode, a record mode and a speech recognition mode, the microphone is configured to receive an external audio signal. The received audio signal may be further stored in the memory 604 or sent out by the communications component 616. In some embodiments, the audio component 610 also includes a loudspeaker for outputting an audio signal.

The I/O interface 612 provides an interface for the processing component 602 and a peripheral interface module, and the peripheral interface module may be a keyboard, a click wheel and buttons, etc. These buttons may include but are not limited to: a home button, a volume button, a start button and a lock button.

The sensor component 614 includes one or more sensors for providing the terminal 600 with state evaluation from all aspects. For example, the sensor component 614 may detect the on/off state of the terminal 600, relative positioning of components, for example, the components are the displayer and keypads of the terminal 600; the sensor component 614 also may detect the position change of the terminal 600 or a component thereof, the presence or absence of the user's touch on the terminal 600, the direction or acceleration/deceleration of the terminal 600, and temperature variation of the terminal 600. The sensor component 614 may include a proximity detector, which is configured to detect the presence of a nearby object in case of no physical contact. The sensor component 614 may also include an optical sensor, for example, a CMOS (Complementary Metal Oxide Semiconductor) or CCD (Charge-coupled Device) image sensor, used in the application of imaging. In some embodiments, the sensor component 614 may also include an acceleration sensor, a gyro sensor, a magnetic sensor, a pressure sensor, or a temperature sensor or thermometer.

The communications component 616 is configured to facilitate wired communications or wireless communications between the terminal 600 and other devices. The terminal 600 is available for access to a wireless network based on communications standards such as WiFi, 2G, 3G, LTE, or 4G cellular technologies, or a combination thereof. In an exemplary embodiment, the communications component 616 receives, by means of a broadcast channel, a broadcast signal or broadcast-related information from an external broadcast management system. In an exemplary embodiment, the communications component 616 also includes an NFC (Near Field Communication) module to promote short-range communications. For example, the NFC module may be implemented on the basis of RFID (Radio Frequency Identification) Technology, IrDA (Infrared Data Association) Technology, UWB (Ultra-wide Bandwidth) Technology, BT (Bluetooth) Technology and other technologies.

In an exemplary embodiment, the terminal 600 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components to execute the foregoing similarity determining method provided by the embodiments corresponding to FIG. 1 or 2.

In an exemplary embodiment, a non-transitory computer-readable storage medium including an instruction is also provided, for example, a memory 604 including the instruction, and the instruction may be executed by the processor 620 of the terminal 600 to achieve the foregoing similarity determining method. For example, the non-transitory computer-readable storage medium may be a ROM, a RAM (Random Access Memory), a CD-ROM (Compact Disc Read-Only Memory), a magnetic tape, a floppy disk and an optical data memory device, etc.

According to the non-transitory computer-readable storage medium provided by the embodiments of the present disclosure, word segmentation is performed on the first character string and the second character string so that they are segmented into a first sequence and a second sequence, thus, determination of the edit distance for converting the first character string into the second character string can be implemented based on each word in the first sequence and the second sequence rather than each character in the first character string and the second character string. Moreover, each word in the character string may include at least one character, a semantic similarity can be thus determined according to the edit distance in combination with a correlation among characters in the character string, so as to achieve a more accurate similarity as determined.

Figure 11:
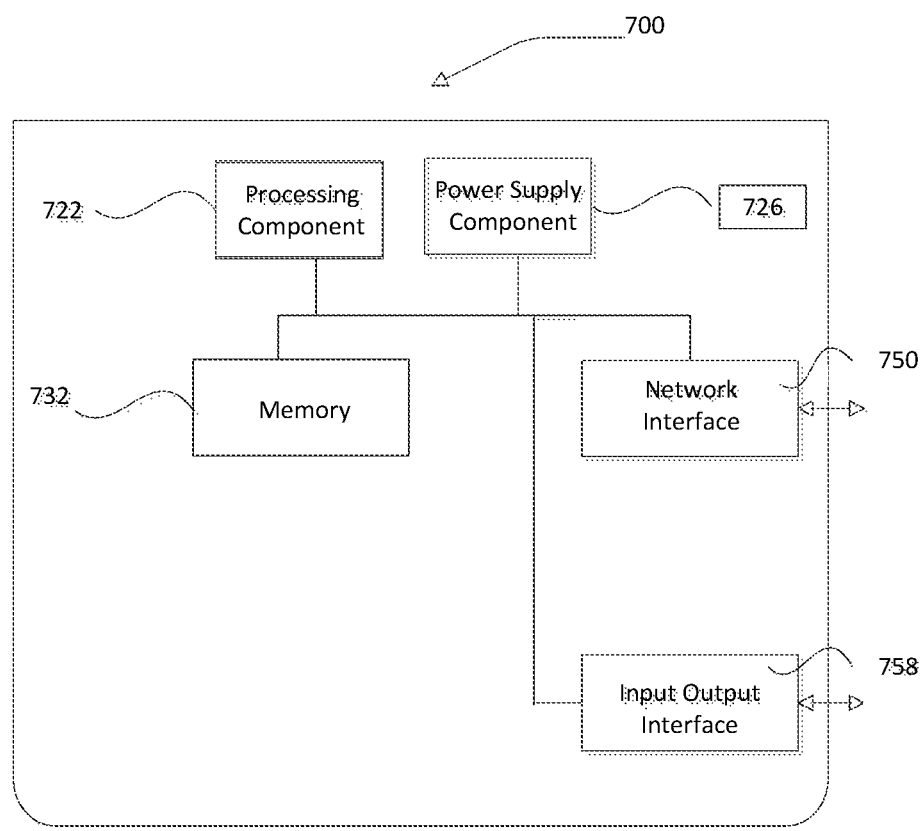
FIG. 11 is a block diagram illustrating a server according to an exemplary embodiment.

In an embodiment, the foregoing similarity determining method provided by the embodiments corresponding to FIG. 1 or 2 may also be executed by a server. FIG. 11 is a block diagram illustrating a server according to an exemplary embodiment. The server may be configured to execute the method for determining similarity provided by the embodiments corresponding to FIG. 1 or 2. Referring to FIG. 11, the server 700 includes a processing component 722, and further includes one or more processors, and memory resource represented by a memory 732 and configured to store instructions that can be executed by the processing component 722, for example, an application program. The application program stored in the memory 732 may include one or more modules each of which is corresponding to a set of instructions. In addition, the processing component 722 is configured to execute the instruction so as to execute the method for determining similarity provided by the embodiments corresponding to FIG. 1 or 2.

The server 700 may also include a power supply component 726 configured to execute the power management of the server 700, a wired or wireless network interface 750 configured to connect the server 700 to the network, and an input/output (I/O) interface 758. The server 700 may operate an operating system stored in the memory 732, for example, Windows Server™, Mac OS X™, Unix™, Linux™, FreeBSD™ or the like.

Each module or unit discussed above for FIG. 4-7, such as the word segmenting module, the first determining module, the second determining module, the acquiring Unit, the first determining unit, the second determining unit, the first determining subunit, the normalizing subunit, the second determining subunit, the third determining subunit, the fourth determining subunit, the firth determining subunit, the third determining module, the fourth determining module, the word segmenting module, the first determining module, the second determining module, the fourth determining module, the fifth determining module, the sixth determining module, and the seventh determining module may take the form of a packaged functional hardware unit designed for use with other components, a portion of a program code (e.g., software or firmware) executable by the processor 820 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method performed by a terminal device having a processor for executing computer instructions for determining semantic similarity between character strings, comprising:
    performing word or phrase segmentation on a first character string and a second character string to obtain a first sequence and a second sequence, the first sequence and the second sequence each comprising at least one word or phrase;
    determining an edit distance between the first character string and the second character string according to a predefined edit distance algorithm, the first sequence and the second sequence;
    acquiring information on operations for converting the first sequence into the second sequence including replacement operation information;
    assigning different operation costs to different type of operations for converting the first sequence into the second sequence;
    determining a pairing number according to the replacement operation information, the pairing number indicating a number of two words or two phrases existing in both the first sequence and the second sequence irrespective of their positions in the first sequence and the second sequence; and
    quantifying a semantic similarity between the first character string and the second character string using the edit distance modified by the pairing number, the operation costs of the operations, a number of words or phrases in the first sequence and a number of words or phrases in the second sequence.

2. The method of claim 1, wherein the operations comprises at least a replacement operation and a swap operation, and wherein the determining the semantic similarity between the first character string and the second character string using the edit distance modified by the pairing number, the operation costs of the operations, the a number of words in the first sequence and a number of words in the second sequence comprises:
    determining a minimum semantic edit distance between the first character string and the second character string according to the edit distance, the pairing number, an operation cost of the replacement operation and an operation cost of the swap operation;
    normalizing the minimum semantic edit distance to obtain a normalized result; and
    determining the semantic similarity between the first character string and the second character string according to the normalized result.

3. The method of claim 2, wherein determining the minimum semantic edit distance between the first character string and the second character string according to the edit distance, the pairing number, the operation cost of the replacement operation and the operation cost of the swap operation comprises:
    determining the minimum semantic edit distance between the first character string and the second character string according to the edit distance, the pairing number, the operation cost of the replacement operation and the operation cost of the swap operation based on, $$\text{minCost}(S1, S2) = d - p(2\text{cost}(T) - \text{cost}(J))$$

wherein, S1 and S2 are the first character string and the second character string, respectively; minCost(S1,S2) is the minimum semantic edit distance; d is the edit distance; p is the pairing number; cost(J) is the operation cost of the swap operation; cost(T) is the operation cost of the replacement operation; and 2cost(T)−cost(J)>0.

4. The method of claim 1, wherein the operations comprises at least one of a replacement operation, a swap operation, an insertion operation, and a deletion operation, and wherein the determining the semantic similarity between the first character string and the second character string using the edit distance modified by the pairing number, the operation costs of the operations, a number of words in the first sequence and a number of words in the second sequence comprises:
    determining a first semantic edit distance between the first character string and the second character string according to the edit distance, the pairing number, an operation cost of the replacement operation and an operation cost of the swap operation;
    determining a second semantic edit distance between the first character string and the second character string according to one of an operation cost of the insertion operation and an operation cost of the deletion operation, the operation cost of the replacement operation, the number of words in the first sequence and the number of words in the second sequence; and
    determining the semantic similarity between the first character string and the second character string according to the first semantic edit distance and the second semantic edit distance.

5. The method of claim 4, wherein determining the first semantic edit distance between the first character string and the second character string according to the edit distance, the pairing number, the operation cost of the replacement operation and the operation cost of the swap operation comprises:
determining the first semantic edit distance between the first character string and the second character string according to the edit distance, the pairing number, the operation cost of the replacement operation and the operation cost of the swap operation based on $$minCost(S1,S2)=d-p(2cost(T)-cost(J));$$

wherein S1 and S2 are the first character string and the second character string, respectively; minCost(S1,S2) is the first semantic edit distance, d is the edit distance; p is the pairing number; cost(J) is the operation cost of the swap operation; cost(T) is the operation cost of the replacement operation; and 2cost(T)−cost(J)>0.

6. The method of claim 4, wherein determining the second semantic edit distance between the first character string and the second character string according to one of the operation cost of the insertion operation and the operation cost of the deletion operation, the operation cost of the replacement operation, the number of words in the first sequence and the number of words in the second sequence comprises:
determining the second semantic edit distance between the first character string and the second character string according to one of the operation cost of the insertion operation and the operation cost of the deletion operation, the operation cost of the replacement operation, the number of words in the first sequence and the number of words in the second sequence based $$normFact(S1,S2)=min(n,m)cost(T)+(max(n,m)-min(n,m))\times costM$$

$$costM=cost(C), \text{ if } n<m$$

$$costM=cost(S), \text{ if } n>m;$$

wherein normFact (S1,S2) is the second semantic edit distance; n is the number of words in the first sequence, m is the number of words in the second sequence; cost(T) is the operation cost of the replacement operation; cost(S) is the operation cost of the deletion operation; and cost(C) is the operation cost of the insertion operation.

7. The method of claim 4, wherein determining the similarity between the first character string and the second character string according to the first semantic edit distance and the second semantic edit distance comprises:
determining the similarity between the first character string and the second character string according to the first semantic edit distance and the second semantic edit distance based on:

$$sim(S1,S2)=1-minCost(S1,S2)/normFact(S1,S2);$$

wherein sim (S1,S2) is the similarity between the first character string and the second character string; minCost(S1,S2) is the first semantic edit distance; and normFact (S1,S2) is the second semantic edit distance.

8. The method of claim 4, further comprising:
determining the operation cost of the replacement operation and the operation cost of the swap operation according to a relation between the replacement operation and the swap operation; and
determining the operation cost of the insertion operation, the operation cost of the deletion operation and the operation cost of the replacement operation according to a relation among the replacement operation, the insertion operation and the deletion operation.

9. The method of claim 8, wherein the operation cost of the replacement operation multiplied by two is greater than the operation cost of the swap operation according to the relation between the replacement operation and the swap operation; and
wherein a sum of the operation cost of the insertion operation and the operation cost of the deletion operation is greater than the operation cost of the replacement operation according to the relation among the replacement operation, the insertion operation and the deletion operation.

10. The method of claim 8, wherein the operation cost of the insertion operation is equal to the operation cost of the deletion operation according to a relation between the insertion operation and the deletion operation.

11. The method of claim 1, wherein determining the edit distance between the first character string and the second character string according to a predefined edit distance algorithm, the first sequence, and the second sequence comprises:
determining the edit distance between the first character string and the second character string according to the predefined edit distance algorithm, the first sequence and the second sequence based on recursively using $$d[i,j]=\min(\\ d[i-1,j]+cos(S),\\ d[i,j-1]+cos(C),\\ d[i-1,j-1]+(cos(T) \text{ if } S1(i)\neq S2(j); \text{ but } 0 \text{ if } S1(i)=S2(j)))$$

wherein i denotes an $i^{th}$ word or phrase in the first sequence; j denotes a $j^{th}$ word or phrase in the second sequence; cost(S) is an operation cost of a deletion operation; cost(C) is an operation cost of a insertion operation; cost(T) is an operation cost of a replacement operation; and d[i,j] represents the edit distance between a subsequence containing first i words or phrases of the first sequence and a subsequence of the second sequence containing first j words or phrases of the second sequence; and
wherein d[n, m] is determined as the edit distance between the first character string and the second character string, wherein n and m are numbers of words or phrases in the first and second sequences, respectively.

12. A terminal device, comprising:
a processor; and
a memory configured to store instructions executable by the processor;
wherein, the processor is configured to:
perform word or phrase segmentation on a first character string and a second character string, to obtain a first sequence and a second sequence, the first sequence and the second sequence each comprising at least one word or phrase;
determine an edit distance between the first character string and the second character string according to a predefined edit distance algorithm, the first sequence and the second sequence;
acquire information on operations for converting the first sequence into the second sequence including replacement operation information;
assign different operation costs to different type of operations for converting the first sequence into the second sequence;

determine a pairing number according to the replacement operation information, the pairing number indicating a number of two words or two phrases existing in both the first sequence and the second sequence irrespective of their positions in the first sequence and the second sequence; and quantify a semantic similarity between the first character string and the second character string using the edit distance modified by the pairing number, the operation costs of the operations, a number of words or phrases in the first sequence and a number of words or phrases in the second sequence.

13. The terminal device of claim 12, wherein the operations comprises at least a replacement operation and a swap operation, and wherein to determine the similarity between the first character string and the second character string using the edit distance modified by the pairing number, the operation costs of the operations, the a number of words in the first sequence and a number of words in the second sequence the processor is configured to:

determine a minimum semantic edit distance between the first character string and the second character string according to the edit distance, the pairing number, an operation cost of the replacement operation and an operation cost of the swap operation;

normalize the minimum semantic edit distance to obtain a normalized result; and determine the semantic similarity between the first character string and the second character string according to the normalized result.

14. The terminal device of claim 12, wherein the operations comprises at least one of a replacement operation, a swap operation, an insertion operation, and a deletion operation, and wherein to determine the semantic similarity between the first character string and the second character string using the edit distance modified by the pairing number, the operation costs of the operations, a number of words in the first sequence and a number of words in the second sequence the processor is configured to:

determine a first semantic edit distance between the first character string and the second character string according to the edit distance, the pairing number, an operation cost of the replacement operation and an operation cost of the swap operation;

determine a second semantic edit distance between the first character string and the second character string according to one of an operation cost of the insertion operation and an operation cost of the deletion operation, the operation cost of the replacement operation, the number of words in the first sequence and the number of words in the second sequence; and determine the semantic similarity between the first character string and the second character string according to the first semantic edit distance and the second semantic edit distance.

15. The terminal device of claim 14, the processor is further configured to:

determine the operation cost of the replacement operation and the operation cost of the swap operation according to a relation between the replacement operation and the swap operation; and determine the operation cost of the insertion operation, the operation cost of the deletion operation and the operation cost of the replacement operation according to a relation among the replacement operation, the insertion operation and the deletion operation.

16. The terminal device of claim 15, wherein the operation cost of the replacement operation multiplied by 2 is greater than the operation cost of the swap operation according to the relation between the replacement operation and the swap operation; and wherein a sum of the operation cost of the insertion operation and the operation cost of the deletion operation is greater than the operation cost of the replacement operation according to the relation among the replacement operation, the insertion operation and the deletion operation.

17. The terminal device of claim 15, wherein the operation cost of the insertion operation is equal to the operation cost of the deletion operation according to a relation between the insertion operation and the deletion operation.

18. A non-transitory computer-readable storage medium having stored therein instructions that, when executed by a processor of a terminal device, causes the terminal device to:

perform word or phrase segmentation on a first character string and a second character string to obtain a first sequence and a second sequence, the first sequence and the second sequence each comprising at least one word or phrase;

determine an edit distance between the first character string and the second character string according to a predefined edit distance algorithm, the first sequence and the second sequence;

assign different operation costs to different type of operations for converting the first sequence into the second sequence;

acquire information on operations for converting the first sequence into the second sequence including replacement operation information;

determine a pairing number according to the replacement operation information, the pairing number indicating a number of two words or two phrases existing in both the first sequence and the second sequence irrespective of their positions in the first sequence and the second sequence; and quantify a semantic similarity between the first character string and the second character string using the edit distance modified by the pairing number, the operation costs of the operations, a number of words or phrases in the first sequence and a number of words or phrases in the second sequence.

* * * * *